US009799377B1

United States Patent
Henry (10) Patent No.: US 9,799,377 B1
(45) Date of Patent: Oct. 24, 2017

(54) GAS-CHARGING HEAD WITH INTEGRAL VALVES

(71) Applicant: Western Digital Technologies, Inc., Irvine, CA (US)

(72) Inventor: Paul H. Henry, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 114 days.

(21) Appl. No.: 14/739,286

(22) Filed: Jun. 15, 2015

Related U.S. Application Data (60) Provisional application No. 62/156,113, filed on May 1, 2015.

(51) Int. Cl.
    *F17C 5/06* (2006.01)
    *G11B 33/14* (2006.01)
    *F17C 13/02* (2006.01)
    *F17C 13/04* (2006.01)

(52) U.S. Cl.
    CPC ............ *G11B 33/1486* (2013.01); *F17C 5/06* (2013.01); *F17C 13/02* (2013.01); *F17C 13/04* (2013.01); *F17C 2260/044* (2013.01)

(58) Field of Classification Search
    CPC .. F17C 13/02; F17C 13/03; F17C 3/06; F17C 2260/044; F17C 3/065; G11B 33/1486
    USPC .......................................................... 141/3
    See application file for complete search history.

(56) References Cited

U.S. PATENT DOCUMENTS

| | | | |
|---|---|---|---|
| 5,309,945 A | * | 5/1994 | Sakai ..................... F16K 1/305 137/861 |
| 6,049,973 A | | 4/2000 | Frank, Jr. et al. |
| 6,467,153 B2 | | 10/2002 | Butts et al. |
| 6,651,192 B1 | | 11/2003 | Viglione et al. |
| 6,657,801 B1 | | 12/2003 | Chue et al. |
| 6,687,093 B1 | | 2/2004 | Butler et al. |
| 6,751,041 B1 | | 6/2004 | Codilian et al. |
| 6,788,480 B1 | | 9/2004 | Codilian et al. |
| 6,791,782 B1 | | 9/2004 | Codilian et al. |
| 6,792,669 B2 | | 9/2004 | Codilian |
| 6,798,592 B1 | | 9/2004 | Codilian et al. |
| 6,894,861 B1 | | 5/2005 | Codilian et al. |
| 6,897,393 B1 | | 5/2005 | Codilian et al. |
| 6,898,044 B1 | | 5/2005 | Chheda |
| 6,943,972 B1 | | 9/2005 | Chue et al. |
| 7,003,626 B1 | | 2/2006 | Chheda et al. |
| 7,027,242 B1 | | 4/2006 | Terrill et al. |
| 7,046,467 B1 | | 5/2006 | Chheda |

(Continued)

*Primary Examiner* — Timothy L Maust
*Assistant Examiner* — Andrew Schmid
(74) *Attorney, Agent, or Firm* — Foley & Lardner LLP (57) ABSTRACT

A gas-charging head for charging a device with gas includes a body and at least one valve mounted on the body. The body includes a plurality of channels in communication with an interior space of the device operable to permit a flow of gas therethrough. At least one valve mounted on the body is in communication with a channel of the plurality of channels. The body and a portion of a channel are operable as a valve manifold for the valve. In another embodiment, a system for charging the device with gas that includes a proportional-integral-differential (PID) controller is provided. In yet another embodiment, a method of charging the device with a gas is also provided. The device may be a hard-disk drive, and the gas may be helium without limitation thereto.

19 Claims, 10 Drawing Sheets

(56) References Cited

U.S. PATENT DOCUMENTS

| | | |
|---|---|---|
| 7,058,759 B1 | 6/2006 | Reiser et al. |
| 7,072,129 B1 | 7/2006 | Cullen et al. |
| 7,076,391 B1 | 7/2006 | Pakzad et al. |
| 7,076,603 B1 | 7/2006 | Chheda |
| 7,136,242 B1 | 11/2006 | Chue et al. |
| 7,139,145 B1 | 11/2006 | Archibald et al. |
| 7,145,744 B1 | 12/2006 | Clawson et al. |
| 7,178,432 B1 | 2/2007 | Han et al. |
| 7,199,959 B1 | 4/2007 | Bryant |
| 7,203,020 B1 | 4/2007 | Viglione et al. |
| 7,209,310 B1 | 4/2007 | Tsai et al. |
| 7,222,410 B1 | 5/2007 | Klassen et al. |
| 7,236,911 B1 | 6/2007 | Gough et al. |
| 7,269,525 B1 | 9/2007 | Gough et al. |
| 7,458,282 B1 | 12/2008 | Wuester, Sr. et al. |
| 7,490,398 B1 | 2/2009 | Klassen et al. |
| 7,506,553 B1 | 3/2009 | Panyavoravaj |
| 7,549,204 B1 | 6/2009 | Vangal-Ramamurthy et al. |
| 7,552,526 B1 | 6/2009 | Klassen et al. |
| 7,559,590 B1 | 7/2009 | Jones |
| 7,561,416 B1 | 7/2009 | Sarraf |
| 7,596,722 B1 | 9/2009 | Pakzad et al. |
| 7,634,375 B1 | 12/2009 | Pakzad et al. |
| 7,653,983 B1 | 2/2010 | Klassen |
| 7,669,711 B1 | 3/2010 | Westwood |
| 7,671,599 B1 | 3/2010 | Tan et al. |
| 7,673,638 B1 | 3/2010 | Boynton et al. |
| 7,690,705 B1 | 4/2010 | Roberts et al. |
| 7,743,486 B1 | 6/2010 | Klassen et al. |
| 7,863,889 B1 | 1/2011 | Bamrungtham |
| 7,869,182 B1 | 1/2011 | Tan et al. |
| 7,869,183 B1 | 1/2011 | Tan et al. |
| 7,874,424 B1 | 1/2011 | Westwood |
| 7,896,218 B2 | 3/2011 | Rakpongsiri et al. |
| 7,900,272 B1 | 3/2011 | Tan et al. |
| 7,912,666 B1 | 3/2011 | Pakzad et al. |
| 7,916,599 B1 | 3/2011 | Panyavoravaj et al. |
| 7,921,543 B2 | 4/2011 | Trongjitwikrai et al. |
| 7,940,487 B1 | 5/2011 | Krishnan et al. |
| 7,974,038 B2 | 7/2011 | Krishnan et al. |
| 7,980,159 B1 | 7/2011 | Han |
| 7,987,585 B1 | 8/2011 | Klassen et al. |
| 8,066,171 B1 | 11/2011 | Rakpongsiri et al. |
| 8,078,421 B1 | 12/2011 | Shastry et al. |
| 8,092,610 B1 | 1/2012 | Tarrant |
| 8,094,414 B1 | 1/2012 | Cheng et al. |
| 8,098,460 B1 | 1/2012 | Jen et al. |
| 8,127,643 B1 | 3/2012 | Tan |
| 8,135,208 B1 | 3/2012 | Vangal-Ramamurthy |
| 8,162,366 B1 | 4/2012 | Tan et al. |
| 8,168,033 B1 | 5/2012 | Mohamad Nor |
| 8,180,487 B1 | 5/2012 | Vangal-Ramamurthy et al. |
| 8,199,425 B1 | 6/2012 | Gustafson et al. |
| 8,218,256 B1 | 7/2012 | Lin et al. |
| 8,223,448 B1 | 7/2012 | Haw et al. |
| 8,230,570 B1 | 7/2012 | Choong |
| 8,245,601 B1 | 8/2012 | Hastama et al. |
| 8,267,831 B1 | 9/2012 | Olsen et al. |
| 8,270,118 B1 | 9/2012 | Cheng et al. |
| 8,300,338 B1 | 10/2012 | McFadyen |
| 8,307,537 B1 | 11/2012 | Klassen et al. |
| 8,312,585 B1 | 11/2012 | Tarrant |
| 8,322,235 B1 | 12/2012 | Keopuang et al. |
| 8,327,529 B1 | 12/2012 | Tan et al. |
| 8,335,049 B1 | 12/2012 | Liu et al. |
| 8,345,367 B1 | 1/2013 | Tharumalingam |
| 8,356,384 B1 | 1/2013 | Ferre et al. |
| 8,369,073 B2 | 2/2013 | Trinh et al. |
| 8,379,363 B1 | 2/2013 | Kolunthavelu et al. |
| 8,387,631 B1 | 3/2013 | Thonghara et al. |
| 8,424,418 B1 | 4/2013 | Wuester, Sr. et al. |
| 8,424,824 B1 | 4/2013 | Tan et al. |
| 8,432,630 B1 | 4/2013 | Lin et al. |
| 8,432,631 B1 | 4/2013 | Lin et al. |
| 8,447,430 B1 | 5/2013 | Tan et al. |
| 8,447,551 B1 | 5/2013 | Ong et al. |
| 8,451,578 B1 | 5/2013 | Tan et al. |
| 8,453,841 B1 | 6/2013 | James et al. |
| 8,454,755 B1 | 6/2013 | Tan et al. |
| 8,485,772 B1 | 7/2013 | Ismail et al. |
| 8,493,681 B1 | 7/2013 | Selvaraj |
| 8,537,480 B1 | 9/2013 | Haw |
| 8,544,164 B1 | 10/2013 | Cheng et al. |
| 8,547,657 B1 | 10/2013 | Liu et al. |
| 8,553,968 B1 | 10/2013 | Lee et al. |
| 8,561,285 B1 | 10/2013 | Vangal-Ramamurthy et al. |
| 8,565,511 B1 | 10/2013 | Sungkhaphong et al. |
| 8,582,229 B1 | 11/2013 | Krishnan |
| 8,596,107 B1 | 12/2013 | Wongdao et al. |
| 8,605,383 B1 | 12/2013 | Wang et al. |
| 8,640,328 B1 | 2/2014 | Yow et al. |
| 8,650,716 B1 | 2/2014 | Methe et al. |
| 8,653,824 B1 | 2/2014 | Liu et al. |
| 8,662,554 B1 | 3/2014 | Srisupun et al. |
| 8,683,676 B1 | 4/2014 | Wuester, Sr. et al. |
| 8,689,433 B1 | 4/2014 | Choong |
| 8,707,531 B1 | 4/2014 | Sungkhaphong et al. |
| 8,713,333 B1 | 4/2014 | Selvaraj |
| 8,763,790 B1 | 7/2014 | Neamsuwan et al. |
| 8,789,446 B1 | 7/2014 | Sungkhaphong et al. |
| 8,811,135 B1 | 8/2014 | Kasino et al. |
| 2001/0029979 A1* | 10/2001 | Zheng ............ F17C 5/02 137/240 |
| 2002/0189709 A1* | 12/2002 | Noah ............ B01J 4/00 141/231 |
| 2003/0034067 A1* | 2/2003 | Haruch ............ F16K 31/1266 137/98 |
| 2008/0084630 A1 | 4/2008 | Trongjitwikrai et al. |
| 2009/0157848 A1 | 6/2009 | Khoo |
| 2010/0108256 A1 | 5/2010 | Roajanasiri et al. |
| 2013/0057986 A1 | 3/2013 | Vangal-Ramamurthy et al. |
| 2013/0248545 A1 | 9/2013 | Thongjitti et al. |

\* cited by examiner

GAS-CHARGING HEAD WITH INTEGRAL VALVES

CROSS-REFERENCE TO RELATED APPLICATION

This application claims priority to provisional U.S. Patent Application Ser. No. 62/156,113, filed on May 1, 2015, which is hereby incorporated by reference in its entirety.

BACKGROUND

Information-storage devices are essential to the functioning of modern society. Amongst the many types of information-storage devices, hard-disk drives (HDDs) occupy a prominent position, if not the dominant position, for the storage of information in the form of digital data, ranging from the storage of data in databases for governmental and financial institutions, to consumer applications such as desktop computers and set-top boxes for digital video. One performance metric of digital information storage in HDDs is areal density (AD), which is a measure of the amount of information that can be stored in a unit of area of the information-storage medium used to store information in the information-storage device, for example, an HDD.

DESCRIPTION OF EMBODIMENTS

Figure 1A:
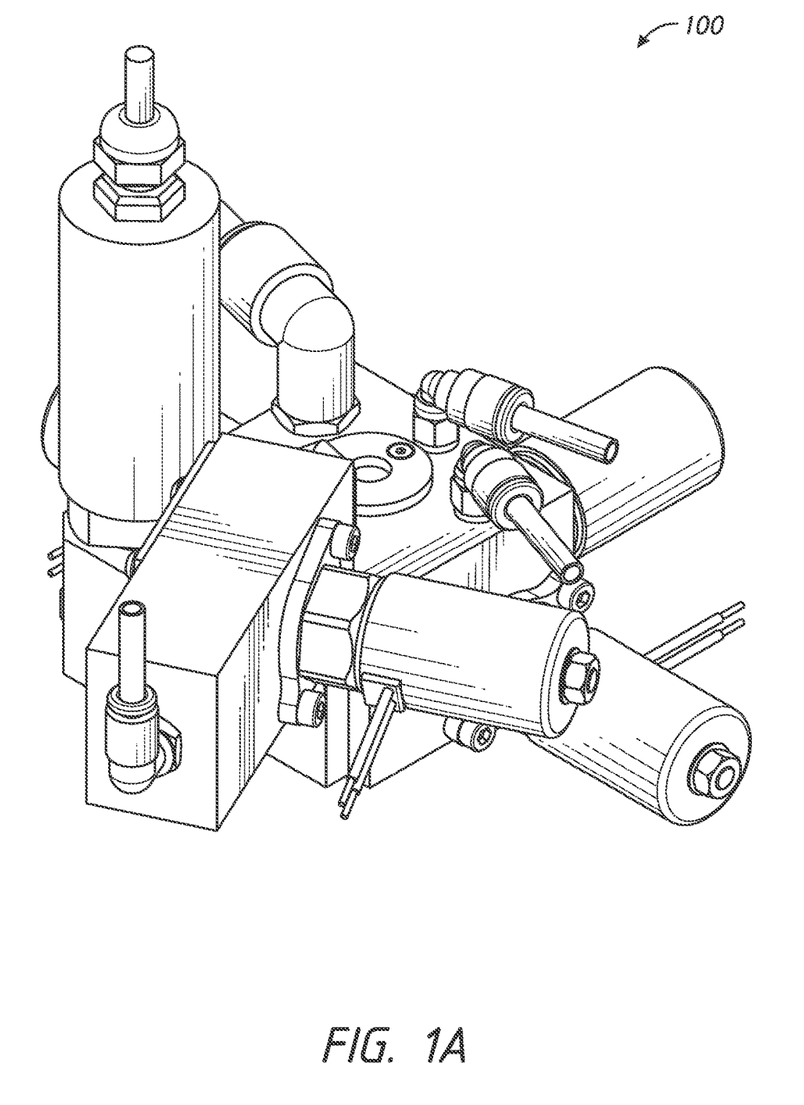
FIG. 1A is a perspective view of a gas-charging head, in one or more embodiments described herein.

Referring now to FIG. 1A, in one or more embodiments, a perspective view of a gas-charging head 100 is shown. In one embodiment, the gas-charging head 100 was developed by the inventor to provide an economical and efficient means for charging the interior space of a device, by way of example without limitation thereto, a data storage device such as a hard disk drive (HDD) or solid-state hybrid drive (SSHD), with a gas, such as helium, hydrogen and/or nitrogen, without limitation thereto. An HDD filled with helium, or alternatively another gas having molecular weight less than that of air, allows a reduction of fly height of a magnetic-recording head over a surface of a magnetic-recording disk in writing and/or reading operations to or from the disk that results in an increased areal density (AD) of information stored therein. In one or more embodiments, utility may be found in one or more of the following, without limitation thereto: reducing the consumption of expensive helium gas in filling the interior space of the HDD, mitigating the release of helium to the surrounding manufacturing environment that is monitored for leakage of trace amounts of helium from sealed HDDs, and/or increasing the speed with which HDDs can be charged with helium using an automated system and method, as for example shown in FIGS. 2 and 3, respectively.

Figure 1B:
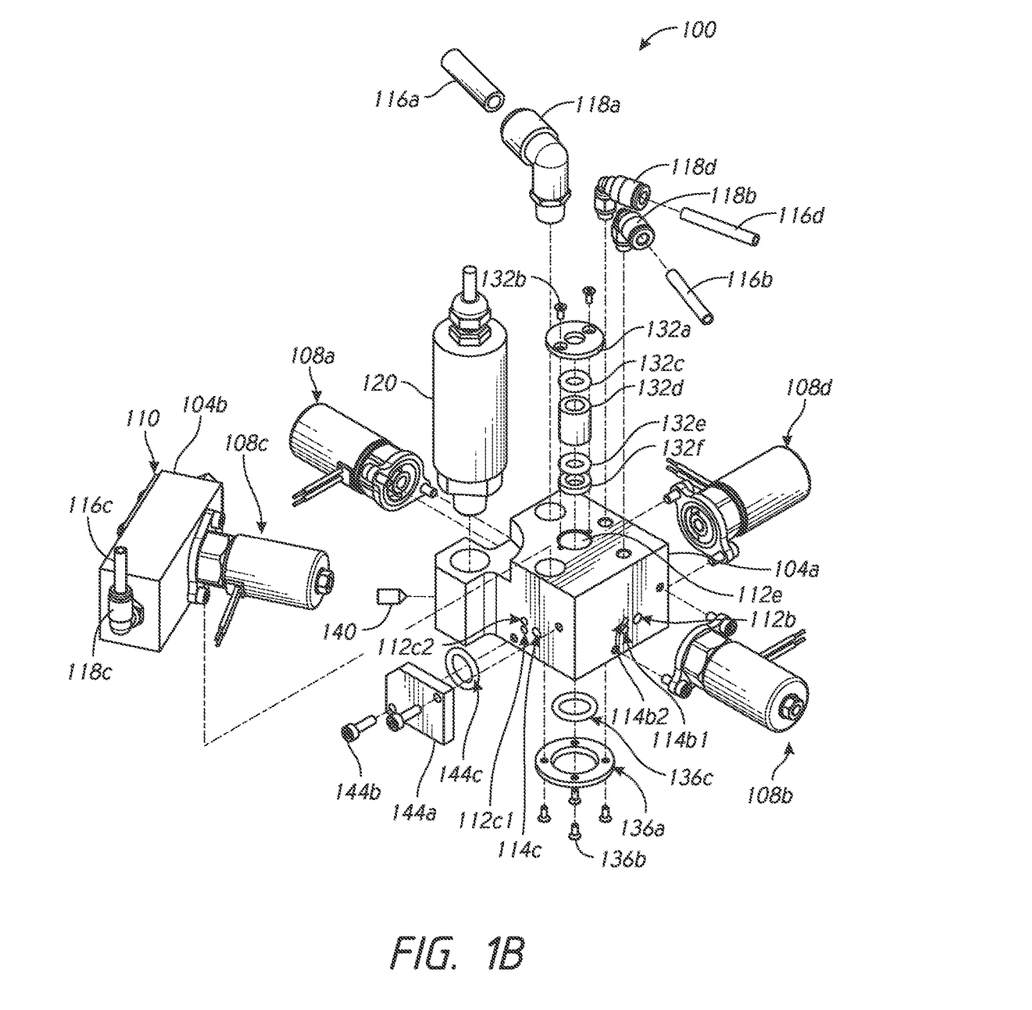
FIG. 1B is an exploded perspective view of the gas-charging head showing its component parts, in one or more embodiments described herein.

Referring now to FIG. 1B, in one embodiment, an exploded perspective view of the gas-charging head 100 detailing its component parts is shown. As shown in FIGS. 1A and 1B, a plurality of valves, by way of example without limitation thereto, valves 108a, 108b, 108c and 108d, are shown integrated in the gas-charging head 100, which eliminates a corresponding plurality of dedicated valve manifolds and tubulation for gas-flow from dedicated valve manifolds to a body, which is substantially different from body 104a of one or more embodiments described herein and shown in FIGS. 1A and 1B. Moreover, the gas-charging head 100 shown in FIGS. 1A and 1B conserves the use of expensive helium gas in filling the interior space of the device (not shown), for example, an HDD (not shown). In one embodiment, the gas-charging head 100 includes the body 104a and at least one valve, by way of example without limitation thereto, valve 108a, 108b, 108c and/or 108d, mounted on the body 104a. With reference also to FIGS. 1D through 1G, the body 104a has a plurality of channels, by way of example without limitation thereto, channels 112a1, 112a2, 112b, 112c1, 112c2, 112d, 112e, 114a, 114b1, 114b2, 114c, 114d1 and 114d2. (As described herein, the plurality of channels may be understood to refer to the set of channels 112a1, 112a2, 112b, 112c1, 112c2, 112d, 112e, 114a, 114b1, 114b2, 114c, 114d1 and 114d2, by way of example without limitation thereto.) In one or more embodiments, the plurality of channels is operable to communicate with an interior space of the device, which further eliminates a corresponding plurality of dedicated valve manifolds and tubulation for gas-flow from dedicated valve manifolds to a body, and also conserves the use of expensive helium gas in filling the interior space of the device, for example, an HDD. At least one channel, by way of example without limitation thereto, channel 112a1, 112a2, 112b, 112c1, 112c2, 112d, 112e, 114a, 114b1, 114b2, 114c, 114d1 and/or 114d2, is operable to permit a flow of gas therethrough. At least one valve, by way of example without limitation thereto, valve 108a, 108b, 108c and/or 108d, may be mounted on the body 104a in communication with the channel, by way of example without limitation thereto, respective channel 112a1, 112a2, 112b, 112c1, 112c2, 112d, 112e, 114a, 114b1, 114b2, 114c, 114d1 and/or 114d2, of the plurality of channels. In one embodiment, the body 104a and a portion of the channel, by way of example without limitation thereto, channel 112a1, 112a2, 112b, 112c1, 112c2, 112d, 112e, 114*a*, 114*b*1, 114*b*2, 114*c*, 114*d*1 and/or 114*d*2, are operable as a valve manifold for the valve, by way of example without limitation thereto, one of respective valves 108*a*, 108*b*, 108*c* and/or 108*d*.

With further reference to FIG. 1B, in one embodiment, the body 104*a* that includes the plurality of channels is operable to permit the flow of gas therethrough to the device, or in the alternative, from the device. In one embodiment, a volume of the plurality of channels is less than a volume of a corresponding plurality of dedicated valve manifolds and tubulation for a gas-flow that the plurality of channels is operable to supply, which conserves the use of expensive helium gas in filling the interior space of the device, for example, an HDD.

With further reference to FIG. 1B, in one embodiment, a plurality of valves, by way of example without limitation thereto, valves 108*a*, 108*b*, 108*c* and 108*d*, is mounted on the body 104*a*, the valve may be a first valve 108*a* of the plurality of valves. (As described hereinafter, the plurality of valves may be understood to refer to the set of valves 108*a*, 108*b*, 108*c* and 108*d*, by way of example without limitation thereto.) In one embodiment, the first valve 108*a* of the plurality of valves is operable to communicate with a vacuum line 116*a*. Similarly, in one or more embodiments, the valve may be a second valve 108*b* of the plurality of valves that is mounted on the body 104*a*. In one embodiment, the second valve 108*b* of the plurality of valves is operable to communicate with a gas-supply line 116*b*. In one embodiment, the gas-supply line 116*b* is operable to supply a gas having molecular weight less than that of air to charge the device. For example, in one embodiment, the gas may be selected from the group of gases consisting of helium, nitrogen, and any mixture of helium and nitrogen, without limitation thereto.

With further reference to FIG. 1B, in one embodiment, a third valve 108*c* is in communication with a third channel, by way of example without limitation thereto, channel 112*c*1, 112*c*2 and/or 114*c*, of the plurality of channels and is operable to communicate with a gas-concentration sensor 110. In one embodiment, the third valve 108*c* may be connected to the third channel, by way of example without limitations thereto, channel 112*c*1, 112*c*2 and/or 114*c*, in the body 104*a* via a gas-sampling line (not shown). As shown in FIGS. 1A and 1B, in one embodiment, the third valve 108*c* and the gas-concentration sensor 110 are mounted on a separate concentration-sensing body 104*b*, without limitation thereto, as the third valve 108*c* and/or the gas-concentration sensor 110 may, in the alternative, be mounted on body 104*a* (see, for example, FIG. 1C). In one embodiment, the valve may be a fourth valve 108*d* of the plurality of valves that is mounted on the body 104*a* that is operable to communicate with a purge-gas-supply line 116*d*.

With further reference to FIG. 1B, in one or more embodiments, the gas-charging head 100 may further include other components, such as a pressure transducer 120 in communication with the plurality of channels, which are subsequently described in the course of the following further description of the gas-charging head 100. The body 104*a* provides for communication between channels of the plurality of channels in delivering gas to the device. For example, first channels 112*a*1 and 112*a*2, second channel 112*b*, third channels 112*c*1 and 112*c*2, and fourth channel 112*d* communicate directly with a central fifth channel 112*e* that communicates directly with a charging port of the device, for example, an HDD. By way of further example, first channel 114*a*, second channels 114*b*1 and 114*b*2, third channel 114*c*, and fourth channels 114*d*1 and 114*d*2 communicate directly with respective vertical riser channels. The vertical riser channels in turn communicate with respective connection elbows 118*a*, 118*b* and 118*d*, except for elbow 118*c* that communicates with channels in the separate concentration-sensing body 104*b*, as the separate concentration-sensing body 104*b* occupies the position that elbow 118*c* would otherwise occupy to communicate with a respective vertical riser channel in body 104*a*. Elbows 118*a*, 118*b*, 118*c* and 118*d* are provided with couplings that allow them to communicate with respective lines 116*a*, 116*b*, 116*c* and 116*d*, viz.: vacuum line 116*a*, gas-supply line 116*b*, low-pressure line 116*c*, and purge-gas-supply line 116*d*. The pressure transducer 120 also communicates with the central fifth channel 112*e* through a respective vertical riser channel and a sixth channel (not shown). Thus, the pressure transducer 120 is operable to be in continuous communication with the interior space of the device through the sixth channel in communication with the fifth channel 112*e* for monitoring the pressure within the interior space of the device to control operations of the plurality of valves affecting the pressure therein throughout the operation of the gas-charging head 100, when in compliant contact with the charging port of the device. As further shown in FIG. 1B, plug 140 seals the opening of the sixth channel, which may be fabricated by drilling, as may other of the channels be fabricated, into the body 104*a* to join the respective vertical riser channel of the pressure transducer 120 with the central fifth channel 112*e*.

With further reference to FIG. 1B, continuing with the description of one or more further embodiments including other components of the gas-charging head 100, the central fifth channel 112*e* is designed to accommodate a sealing tool 128 (see, for example FIG. 1H) for opening and/or closing a charging port seal of the charging port of the device. In one embodiment, the charging port seal may include a sticky label; in another embodiment, the charging port seal may include a charging port screw, without limitation to either. In either case, the sealing tool 128 may include a shaft portion disposed in the center of the central fifth channel 112*e* by sleeve 132*d*. In one or more embodiments, the shaft portion of the sealing tool 128 is sealed in the central fifth channel 112*e* by an upper O-ring 132*c* and a lower O-ring 132*e* disposed above and below sleeve 132*d*, respectively. The lower O-ring 132*e* may be further disposed between sleeve 132*d* and a limit washer 132*f*, that bottoms out on a lip portion of the central fifth channel 112*e* produced by providing the central fifth channel 112*e* with an upper diameter greater than a lower diameter thereof. The upper O-ring 132*c* may be further disposed between sleeve 132*d* and an annular compression plate 132*a* provided with screw holes for fastening the compression plate 132*a* to the body 104*a* with screws, of which screw 132*b* is an example.

With further reference to FIG. 1B, continuing with the description of one or more further embodiments including other components of the gas-charging head 100, the central fifth channel 112*e* is further operable to accommodate the charging port of the device. In one embodiment, charging port O-ring 136*c* may be disposed between body 104*a* and a second annular compression plate 136*a* provided with screw holes for fastening the second compression plate 136*a* to the body 104*a* with screws, of which screw 136*b* is an example. The charging port O-ring 136*c* is operable to engage the charging port of the device to create a gas-tight seal that precludes leakage of gas when the device is being charged with gas.

With further reference to FIG. 1B, continuing with the description of one or more further embodiments including other components of the gas-charging head 100, third channels 112c1, 112c2 and 114c may be provided with a means of communicating with each other in the absence of the third valve 108c being mounted directly on the body 104a. In one embodiment, blanking-plate O-ring 144c may be disposed between body 104a and a blanking plate 144a provided with screw holes for fastening the blanking plate 144a to the body 104a with screws, of which screw 144b is an example. In one embodiment, when the blanking plate 144a is fastened to the body 104a with the blanking-plate O-ring 144c interposed therebetween a cavity is created therebetween allowing for communication of the third channels 112c1, 112c2 and 114c with one another that is sealed off from the surrounding environment of the gas-charging head 100 so that gas can flow therebetween without leakage to or from the surrounding environment.

Figure 1C:
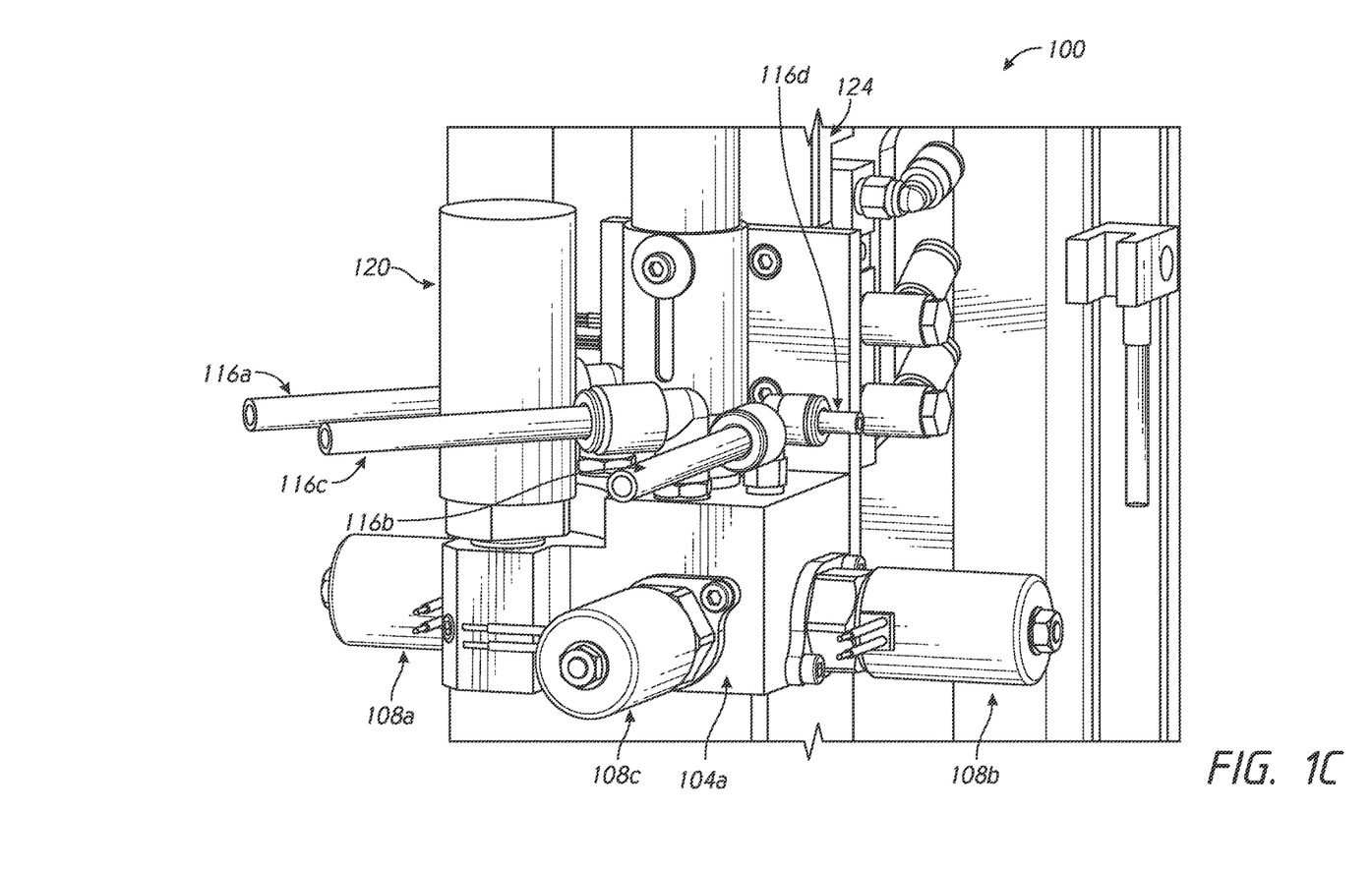
FIG. 1C is an enlarged perspective view of the gas-charging head showing a third valve mounted directly on a body of the gas-charging head, in one or more alternative embodiments described herein.

Referring now to FIG. 1C, in an alternative embodiment, an enlarged perspective view of the gas-charging head 100 in which the third valve 108c is mounted directly on the body 104a of the gas-charging head 100 is shown. As shown in FIG. 1C, in an alternative embodiment, the third valve 108c is mounted directly over the ports to third channels 112c1, 112c2 and 114c. As described above, third channels 112c1, 112c2 and 114c in combination with the body 104a provide the function of a valve manifold for the third valve 108c. Alternatively, the third valve 108c may be mounted on a separate concentration-sensing body 104b as shown in FIGS. 1A and 1B, in which the concentration-sensing body 104b is mounted over the vertical riser channel associated with gas flows to the third valve 108c. In yet another embodiment, the third valve 108c may be mounted on a separate concentration-sensing body 104b in a similar way as shown in FIGS. 1A and 1B, but in which the concentration-sensing body 104b communicates indirectly with the vertical riser channel associated with gas flows to the third valve 108c through a gas-sampling line (not shown) that communicates directly with the vertical riser channel associated with gas flows to the third valve 108c, being attached thereto with an elbow similar to 118c.

With further reference to FIG. 1C, in an alternative embodiment, the four valves 108a, 108b, 108c and 108d are mounted on the body 104a, which provides for a less massive gas-charging head that due to lesser inertia can move more rapidly to make compliant contact with the device for charging the device with gas. As shown in FIG. 1C, in one embodiment, the gas-charging head 100 may be provided with a slide bracket 124 that engages a rail to allow the gas-charging head 100 to move up and down the rail in making compliant contact with the device for charging the device with gas. As shown in FIG. 1C, first valve 108a, second valve 108b, third valve 108c and fourth valve 108d (hidden behind the body 104a in the perspective view of FIG. 1C) communicate through channels in the body 104a with respective lines, viz., vacuum line 116a, gas-supply line 116b, low-pressure line 116c, and purge-gas-supply line 116d. In one embodiment, low-pressure line 116c may also function as a gas-sampling line communicating with the separate concentration-sensing body 104b (not shown in FIG. 1C) in which the gas-concentration sensor 110 (not shown in FIG. 1C) is installed. In an alternative embodiment, the gas-concentration sensor 110 (not shown in FIG. 1C) may be installed on the body 104a in communication with third valve 108c by means of additional channels within body 104a.

Figure 1D:
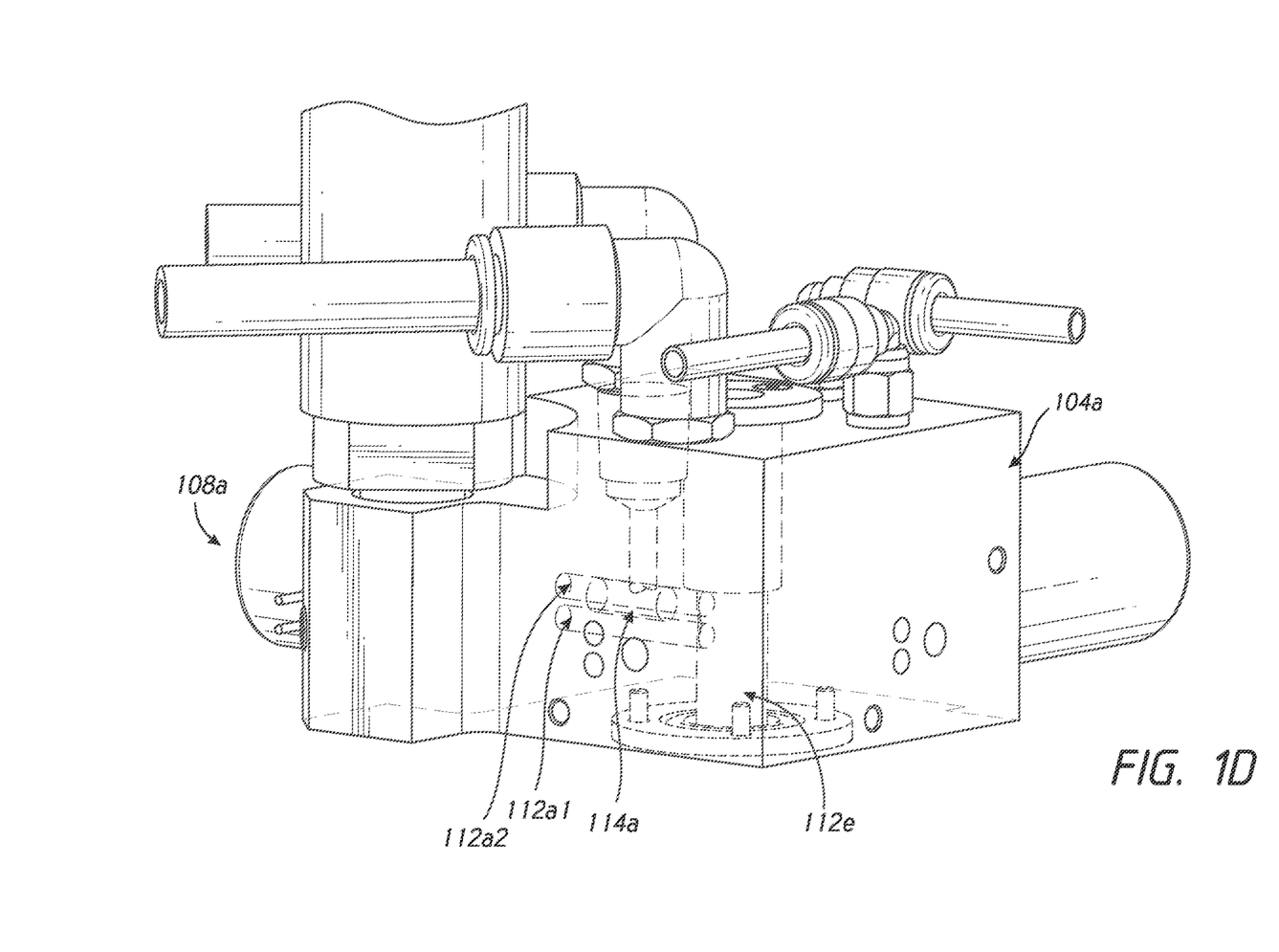
FIG. 1D is an enlarged perspective view of the gas-charging head showing an arrangement of channels communicating with a first valve, in one or more embodiments described herein.

Referring now to FIG. 1D and with further reference to FIG. 1B, in one embodiment, an enlarged perspective view of the gas-charging head 100 detailing an arrangement of first channels, by way of example without limitation thereto, channels 112a1, 112a2 and 114a, communicating with a first valve 108a is shown. In one embodiment, the first channels 112a1, 112a2 and 114a may be differentiated with respect to their functionality relative to first valve 108a, as follows: the first channels 112a1 and 112a2 are inbound to first valve 108a from centrally located fifth channel 112e, which is operable to communicate directly with the charging port of the device; and, the first channel 114a is outbound from first valve 108a to the vertical riser channel for the first valve 108a, which communicates directly with the vacuum line 116a. (As used herein, the terms of art "inbound" and "outbound" refer to the direction of gas flow in a channel, respectively, to or from a valve with which the channel communicates.) This arrangement allows for substantially equal cross-sectional areas for gas conductance between the inbound pair of first channels 112a1 and 112a2 and outbound first channel 114a, as the inbound first channels 112a1 and 112a2 engage with a narrow annular orifice on the valve face of first valve 108a, whereas the outbound first channel 114a engages with a larger diameter circular orifice on the valve face of first valve 108a. However, in one or more other embodiment, the first channels 112a1 and 112a2 that engage with the narrow annular orifice on the valve face of first valve 108a may be outbound channels, whereas the first channel 114a that engages with the larger diameter circular orifice on the valve face of first valve 108a may be an inbound channel. In this latter embodiment, the first channels 112a1, 112a2 and 114a are differentiated with respect to their connectivity relative to the fifth channel 112e and the vacuum line 116a, as follows: the first channel 114a is inbound (not shown in FIG. 1D) to first valve 108a from centrally located fifth channel 112e, which is operable to communicate directly with the charging port of the device; and, the first channels 112a1 and 112a2 are outbound (not shown in FIG. 1D) from first valve 108a to the vertical riser channel for the first valve 108a, which communicates directly with the vacuum line 116a. Therefore, it should be recognized that a variety of other configurations within the interior of body 104a for channels communicating with the first valve 108a are within the spirit and scope of one or more embodiments, although not expressly shown herein.

Figure 1E:
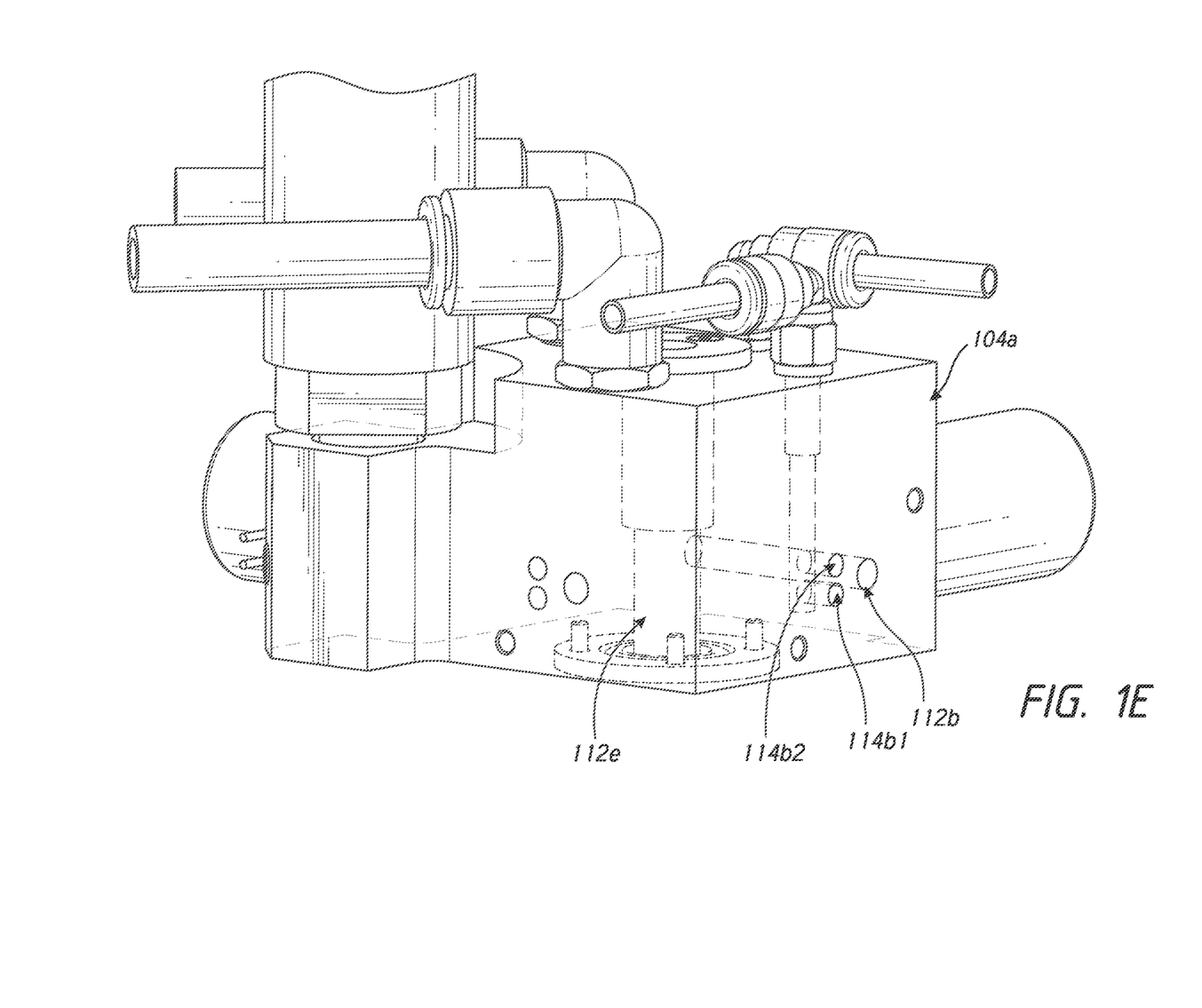
FIG. 1E is an enlarged perspective view of the gas-charging head showing an arrangement of channels communicating with a second valve, in one or more embodiments described herein.

Referring now to FIG. 1E and with further reference to FIG. 1B, in one embodiment, an enlarged perspective view is shown of the gas-charging head 100 detailing an arrangement of second channels, by way of example without limitation thereto, channels 112b, 114b1 and 114b2, for communicating with a second valve 108b (not shown). In one embodiment, the second channels 112b, 114b1 and 114b2 may be differentiated with respect to their functionality relative to second valve 108b, as follows: the second channels 114b1 and 114b2 are inbound to second valve 108b from the vertical riser channel for the second valve 108b, which communicates directly with the gas-supply line 116b; and, the second channel 112b is outbound from second valve 108b to centrally located fifth channel 112e, which is operable to communicate directly with the charging port of the device. This arrangement allows for substantially equal cross-sectional areas for gas conductance between the inbound pair of second channels 114b1 and 114b2, and outbound second channel 112b, as the inbound second channels 114b1 and 114b2 engage with a narrow annular orifice on the valve face of second valve 108b, whereas the outbound second channel 112b engages with a larger diameter circular orifice on the valve face of second valve 108b. However, in one or more other embodiment, the second channels 114b1 and 114b2 that engage with the narrow annular orifice on the valve face of second valve 108b may be outbound channels, whereas the second channel 112b that engages with the larger diameter circular orifice on the valve face of second valve 108b may be an inbound channel. In this latter embodiment, the second channels 112b, 114b1 and 114b2 are differentiated with respect to their connectivity relative to the fifth channel 112e and the gas-supply line 116b, as follows: the second channel 112b is inbound (not shown in FIG. 1D) to second valve 108b from the vertical riser channel for the second valve 108b, which communicates directly with the gas-supply line 116b; and, the second channels 114b1 and 114b2 are outbound (not shown in FIG. 1D) from second valve 108b to centrally located fifth channel 112e, which is operable to communicate directly with the charging port of the device. Therefore, it should be recognized that a variety of other configurations within the interior of body 104a for channels communicating with the second valve 108b are within the spirit and scope of one or more embodiments, although not expressly shown herein.

Figure 1F:
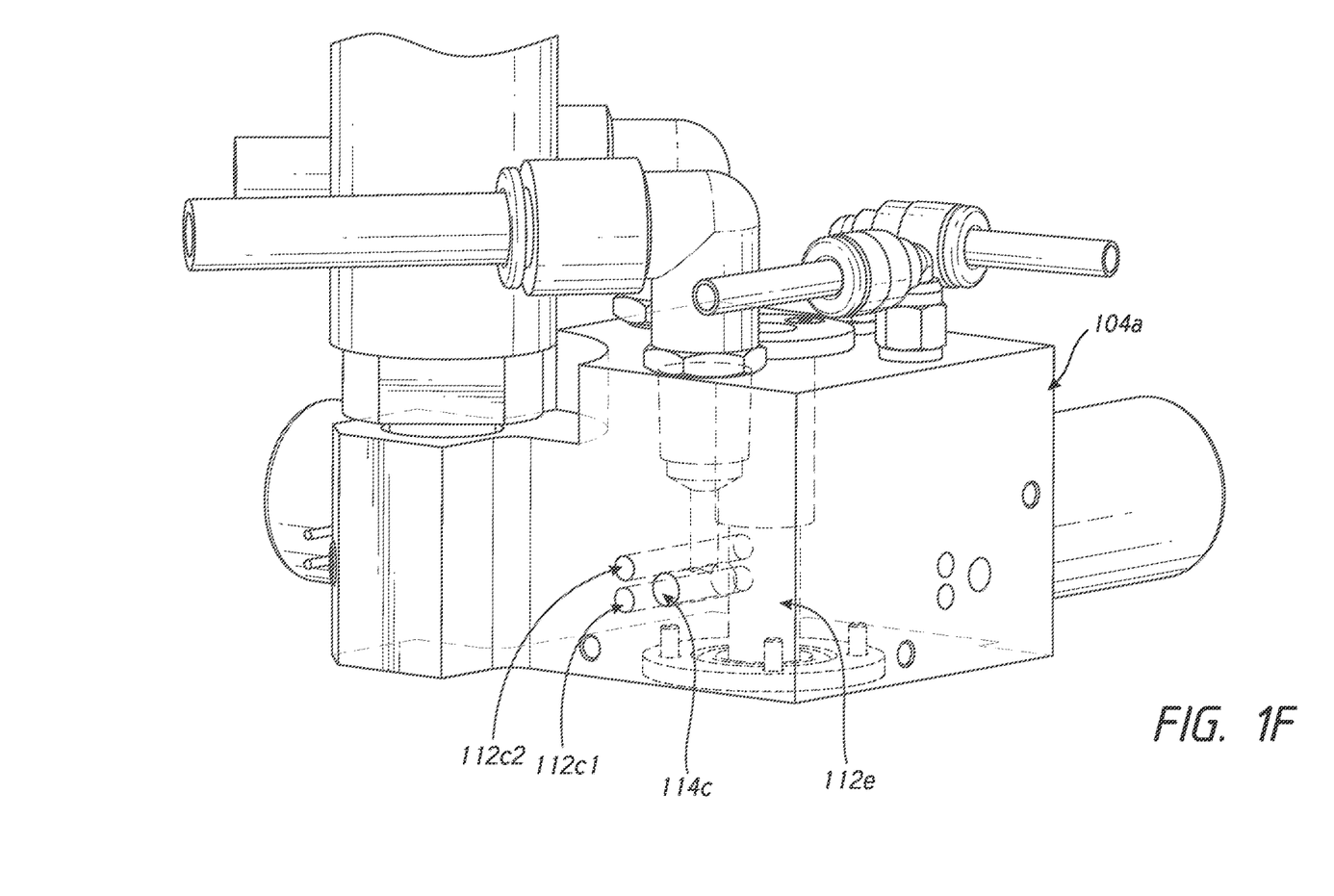
FIG. 1F is an enlarged perspective view of the gas-charging head showing an arrangement of channels communicating with a third valve, in one or more embodiments described herein.

Referring now to FIG. 1F and with further reference to FIG. 1B, in one embodiment, an enlarged perspective view of the gas-charging head 100 detailing an arrangement of third channels, by way of example without limitation thereto, channels 112c1, 112c2 and 114c, communicating with a third valve 108c is shown. In one embodiment, the third channels 112c1, 112c2 and 114c may be differentiated with respect to their functionality relative to third valve 108c, as follows: the third channels 112c1 and 112c2 are inbound to third valve 108c from centrally located fifth channel 112e, which is operable to communicate directly with the charging port of the device; and, the third channel 114c is outbound from third valve 108c to the vertical riser channel for the third valve 108c, which communicates directly with the low-pressure line 116c. This arrangement allows for substantially equal cross-sectional areas for gas conductance between the inbound pair of third channels 112c1 and 112c2 and outbound third channel 114c, as the inbound third channels 112c1 and 112c2 engage with a narrow annular orifice on the valve face of third valve 108c, whereas the outbound third channel 114c engages with a larger diameter circular orifice on the valve face of third valve 108c. However, in one or more other embodiment, the third channels 112c1 and 112c2 that engage with the narrow annular orifice on the valve face of third valve 108c may be outbound channels, whereas the second channel 114c that engages with the larger diameter circular orifice on the valve face of third valve 108c may be an inbound channel. In this latter embodiment, the third channels 112c1, 112c2 and 114c are differentiated with respect to their connectivity relative to the fifth channel 112e and the low-pressure line 116c, as follows: the third channel 114c is inbound (not shown in FIG. 1D) to third valve 108c from centrally located fifth channel 112e, which is operable to communicate directly with the charging port of the device; and, the third channels 112c1 and 112c2 are outbound (not shown in FIG. 1D) from third valve 108c to the vertical riser channel for the third valve 108c, which communicates directly with the low-pressure line 116c. Therefore, it should be recognized that a variety of other configurations within the interior of body 104a for channels communicating with the third valve 108c are within the spirit and scope of one or more embodiments, although not expressly shown herein.

Figure 1G:
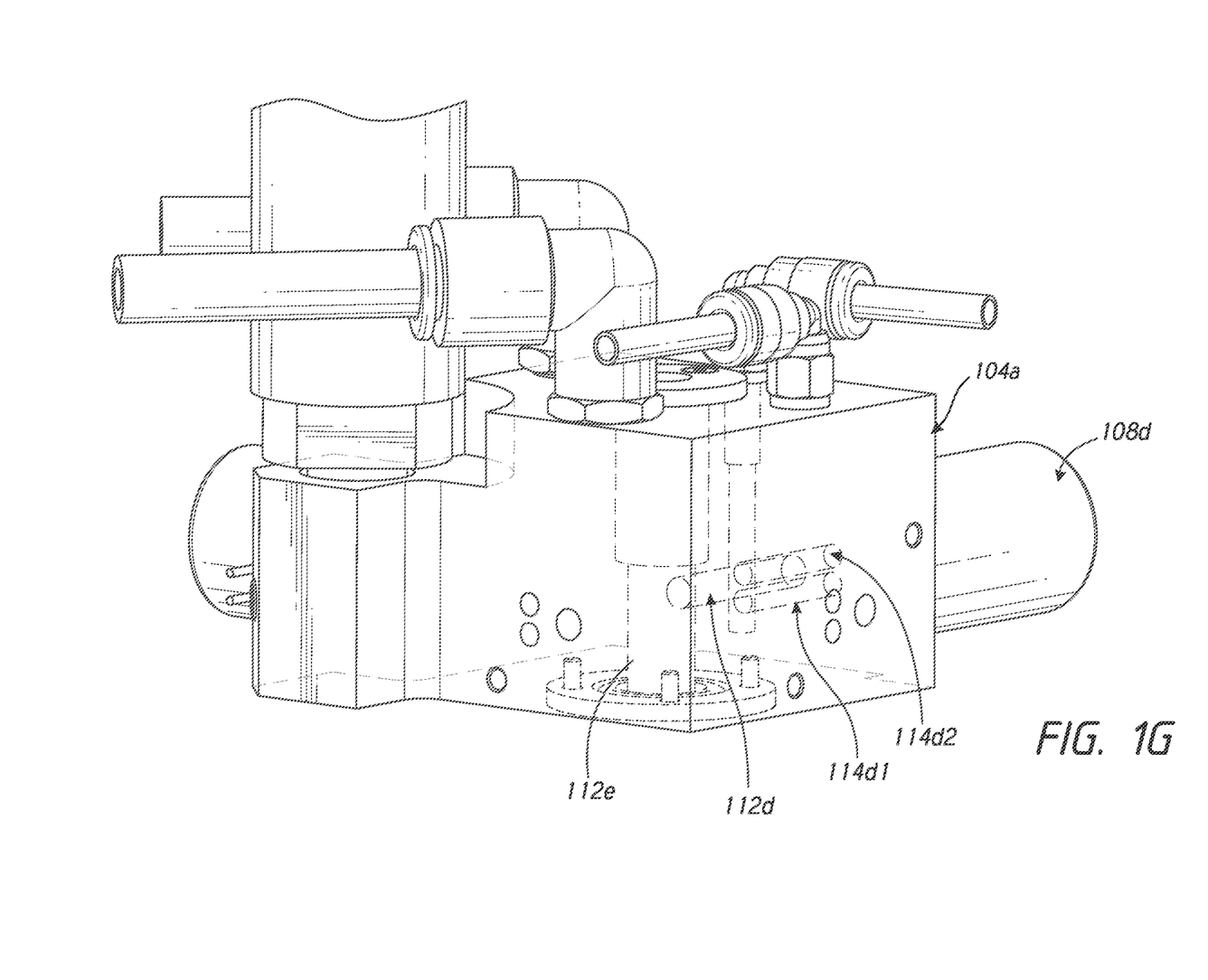
FIG. 1G is an enlarged perspective view of the gas-charging head showing an arrangement of channels communicating with a fourth valve, in one or more embodiments described herein.

Referring now to FIG. 1G and with further reference to FIG. 1B, in one embodiment, an enlarged perspective view of the gas-charging head 100 detailing an arrangement of fourth channels, by way of example without limitation thereto, channels 112d, 114d1 and 114d2, communicating with a fourth valve 108d is shown. In one embodiment, the fourth channels 112d, 114d1 and 114d2 may be differentiated with respect to their functionality relative to fourth valve 108d, as follows: the fourth channels 114d1 and 114d2 are inbound to fourth valve 108d from the vertical riser channel for the fourth valve 108d, which communicates directly with the purge-gas-supply line 116d; and, the fourth channel 112d is outbound from fourth valve 108d to centrally located fifth channel 112e, which is operable to communicate directly with the charging port of the device. This arrangement allows for substantially equal cross-sectional areas for gas conductance between the inbound pair of fourth channels 114d1 and 114d2, and outbound fourth channel 112d, as the inbound fourth channels 114d1 and 114d2 engage with a narrow annular orifice on the valve face of fourth valve 108d, whereas the outbound fourth channel 112d engages with a larger diameter circular orifice on the valve face of fourth valve 108d. However, in one or more other embodiment, the fourth channels 114d1 and 114d2 that engage with the narrow annular orifice on the valve face of fourth valve 108d may be outbound channels, whereas the fourth channel 112d that engages with the larger diameter circular orifice on the valve face of fourth valve 108d may be an inbound channel. In this latter embodiment, the fourth channels 112d, 114d1 and 114d2 are differentiated with respect to their connectivity relative to the fifth channel 112e and the purge-gas-supply line 116d, as follows: the fourth channel 112d is inbound (not shown in FIG. 1D) to fourth valve 108d from the vertical riser channel for the fourth valve 108d, which communicates directly with the purge-gas-supply line 116d; and, the fourth channels 114d1 and 114d2 are outbound (not shown in FIG. 1D) from fourth valve 108d to centrally located fifth channel 112e, which is operable to communicate directly with the charging port of the device. Therefore, it should be recognized that a variety of other configurations within the interior of body 104a for channels communicating with the fourth valve 108d are within the spirit and scope of one or more embodiments, although not expressly shown herein.

Figure 1H:
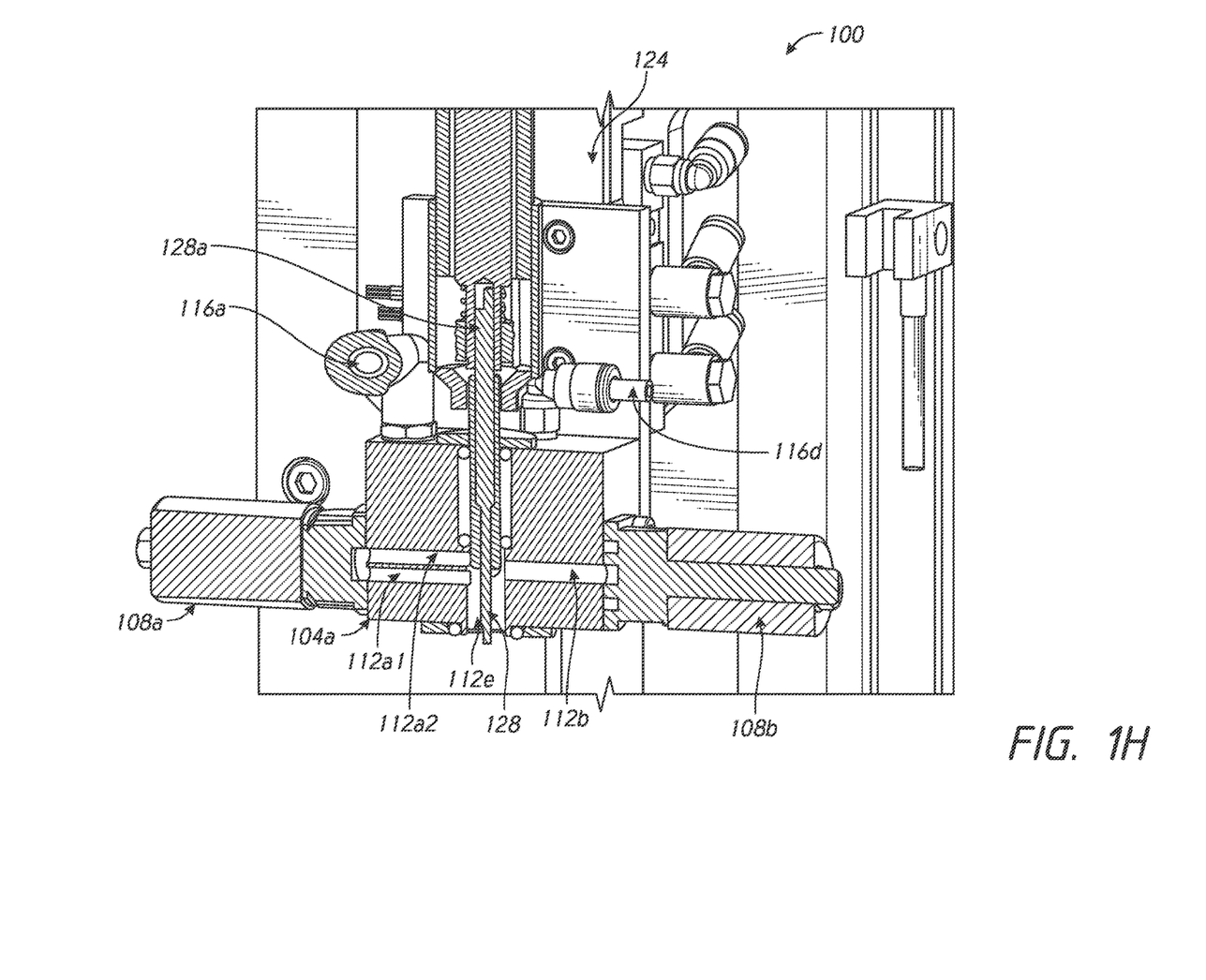
FIG. 1H is an enlarged perspective cross-sectional view of the gas-charging head showing dual channels and a single channel communicating with a central channel and respective first and second valves, in one or more embodiments described herein.

Referring now to FIG. 1H, in one embodiment, an enlarged perspective cross-sectional view of the gas-charging head 100 is shown. As shown in FIG. 1H, in one embodiment, the two first channels 112a1 and 112a2 and the single second channel 112b are shown in communication with first valve 108a and second valve 108b, respectively; the two first channels 112a1 and 112a2 and the single second channel 112b are also shown in communication with the central fifth channel 112e. In one embodiment, the first channel 114a (not shown in the cross-sectional view) communicates with the first valve 108a and the vertical riser channel (not shown in the cross-sectional view) that communicates with the vacuum line 116a. FIG. 1H is representative of other similar configurations of the channels associated with the remaining valves of the plurality of valves of the gas-charging head 100, one or more embodiments of which may also be appreciated with reference to the preceding FIGS. 1D-1G. In one embodiment, the gas-charging head 100 may further include a sealing tool 128, which includes a shaft portion 128a. In one embodiment without limitation thereto, the sealing tool 128 may be a screwdriver that is operable to loosen a charging port screw in a charging port of the device. Alternatively, in one embodiment, the sealing tool 128 may be a rod disposed in the fifth channel 112e of the gas-charging head 100. In one embodiment, the fifth channel 112e is operable to communicate with the charging port of the device. In one embodiment, a charging-port seal may be disposed on the end of the rod such that the rod is operable to place the charging-port seal over an orifice of the charging port. In another embodiment, the gas-charging head 100 includes the slide bracket 124 that is part of a mechanism for moving the gas-charging head 100 into compliant contact with the device. Finally, in one embodiment, the purge-gas-supply line 116d that is in communication with fourth valve 108d is also shown in FIG. 1H.

Figure 2:
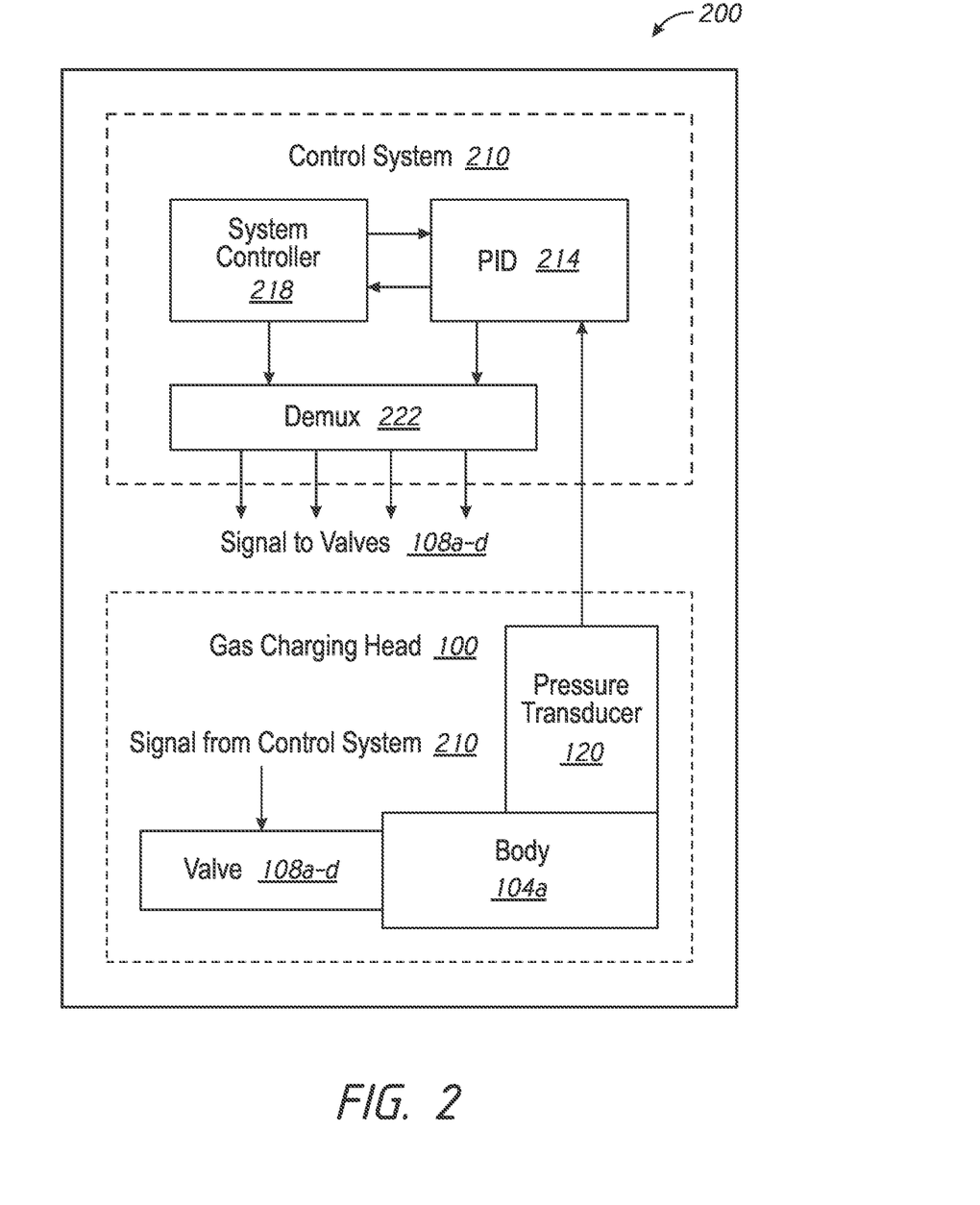
FIG. 2 is a schematic diagram of a system in which the gas-charging head is incorporated, in one or more embodiments described herein.

Referring now to FIG. 2, in one embodiment, a schematic diagram of a system 200 in which the gas-charging head 100 is incorporated is shown. In one embodiment, the gas-charging head 100 is incorporated into a system 200 that further includes a proportional-integral-differential (PID) controller 214 and a pressure transducer 120 in communication with the plurality of channels that is operable to sense gas pressure within the interior space of the device. In one or more embodiments, the system 200 further includes two principal sub-systems, including namely: the gas-charging head 100 and a control system 210. In one embodiment, the control system 210 includes the PID controller 214, a system controller 218 operable to send signals to the PID controller and to receive signals from the PID controller 214, and a demultiplexer (Demux) 222 operable to receive signals from the system controller 218 and the PID controller 214 and to send control signals to the plurality of valves, viz., valves 108a, 108b, 108c and/or 108d. As described above, the gas-charging head 100 includes the body 104a, the plurality of valves, viz., valves 108a, 108b, 108c and 108d, in communication with the plurality of channels within the body 104a, which are operable to receive signals from the demultiplexer 222, and the pressure transducer 120 that is operable to send a signal to the PID controller 214 in the control system 210. In one or more embodiments, the system controller 218 may comprise an apparatus selected from the group consisting of a timer, a bank of programmable electronic switches, a computer, programmable logic array (PLA), or similar cybernetic device, or any combination of the preceding that may be programmed in firmware (FW) and/or software (SW) that includes, for example without limitation thereto, machine executable code to execute the operations of charging the device with a charge of gas, as subsequently described (see, for example, FIG. 3 and/or subsequent discussion of FIG. 2).

With further reference to FIG. 2, in one embodiment, the PID controller 214 senses a signal from the pressure transducer 120 and controls a current, or alternatively a voltage, that is supplied to the valve, by way of example without limitation thereto, valve 108a, 108b, 108c or alternatively 108d to proportionally control flow of the gas therethrough. Thus, in one or more embodiments, first valve 108a, second valve 108b, third valve 108c and fourth valve 108d may be compact proportional solenoid valves, without limitation thereto. In one embodiment, the PID controller 214 is operable to control gas flows through the plurality of valves that is in communication with the plurality of channels. In one embodiment, the system 200 further includes a system controller 218 operable to direct an output of the PID controller 214 to the valve, by way of example without limitation thereto, one of the valves 108a, 108b, 108c or alternatively 108d. In one embodiment, the system 200 further includes a slide bracket 124 that is part of a mechanism for moving the gas-charging head 100 into compliant contact with the device.

With further reference to FIG. 2, in one or more embodiments, the operation of the system 200 to charge a device using the gas-charging head 100 is next described. The gas-charging head 100 is brought into compliant contact with the device to form a gas-tight connection between a channel, for example, channel 112e, of the gas-charging head 100 and a charging port in communication with the interior space of the device. The channel, for example, channel 112e, of the gas-charging head 100 is presented to the charging port to allow flow of gas through the channel, for example, channel 112e, in communication with the interior space of the device. (As used herein, the phrase "presented to the charging port" may refer to removing a screw from the charging port, or alternatively, engaging with an open charging port not having a screw, without limitation thereto.) A first valve 108a is opened to allow flow of gas through a first channel 112a1, 112a2, 114a from an interior space of the device to a vacuum line 116a to evacuate gas from the interior space of the device. The PID controller 214 controls the first valve 108a based on the pressure sensed by a pressure transducer 120. The first valve 108a is closed; and, a second valve 108b is opened to allow flow of gas through a second channel 112b, 114b1, 114b2 to the interior space of the device to charge the interior space of the device with a quantity of the gas. The second valve 108b is closed; and, a third valve 108c is opened to allow flow of a sample of the gas through a third channel 112c1, 112c2, 114c from an interior space of the device to a gas-concentration sensor 110 to determine a concentration of the gas in the interior space of the device.

With respect to the foregoing description, from the viewpoint of a helium filled HDD, one or more embodiments allow an in-process, non-destructive helium concentration check for the interior space of the HDD that avoids a post-assembly test that changes the internal helium concentration. (Although helium and HDD are used in the following description, it will be recognized that the description applies more generally to other gases and devices, respectively, in one or more embodiments described herein.) The PID controller 214 controls the second valve 108b based on the pressure sensed by a pressure transducer 120. At which time, the helium concentration is established at a slightly higher pressure than the final target pressure for the interior specification of the HDD. The PID controller 214 opens the third valve 108c that allows some of the helium-air mixture to flow out of the interior space of the HDD to reduce the pressure to the final target value. As the helium-air mixture flows out of the HDD, it passes the gas-concentration sensor 110. A sample is thereby captured and checked for concentration during the process without affecting the final pressure or concentration.

Continuing with further description of one or more embodiments related to FIG. 2, the system 220 is operable to perform the following further operations. The third valve 108c is closed to establish a final pressure within the interior space of the device. The charging port is sealed to preclude flow of gas through a channel, for example, channel 112e, in communication with the interior space of the device. (As used herein, the phrase "sealed to preclude flow of gas" may refer to tightening a screw in the charging port to preclude gas flow therethrough, or alternatively, placing a charging-port seal, by way of example without limitation thereto, a gas-flow-restricting sticky label, over an orifice of a charging port not having a screw, without limitation thereto.) The third valve 108c is closed; and, a fourth valve 108d is opened to allow flow of a purge gas through a fourth channel 112d, 114d1, 114d2 to purge the channel, for example, channel 112e, of the gas-charging head 100. The third valve 108c and the fourth valve 108d are both closed after purging the channel, for example, channel 112e. The gas-charging head 100 is removed from compliant contact with the device. The device may be removed from the work station in which the system is located, and another device loaded into the work station to be charged with gas by the system 200.

Figure 3:
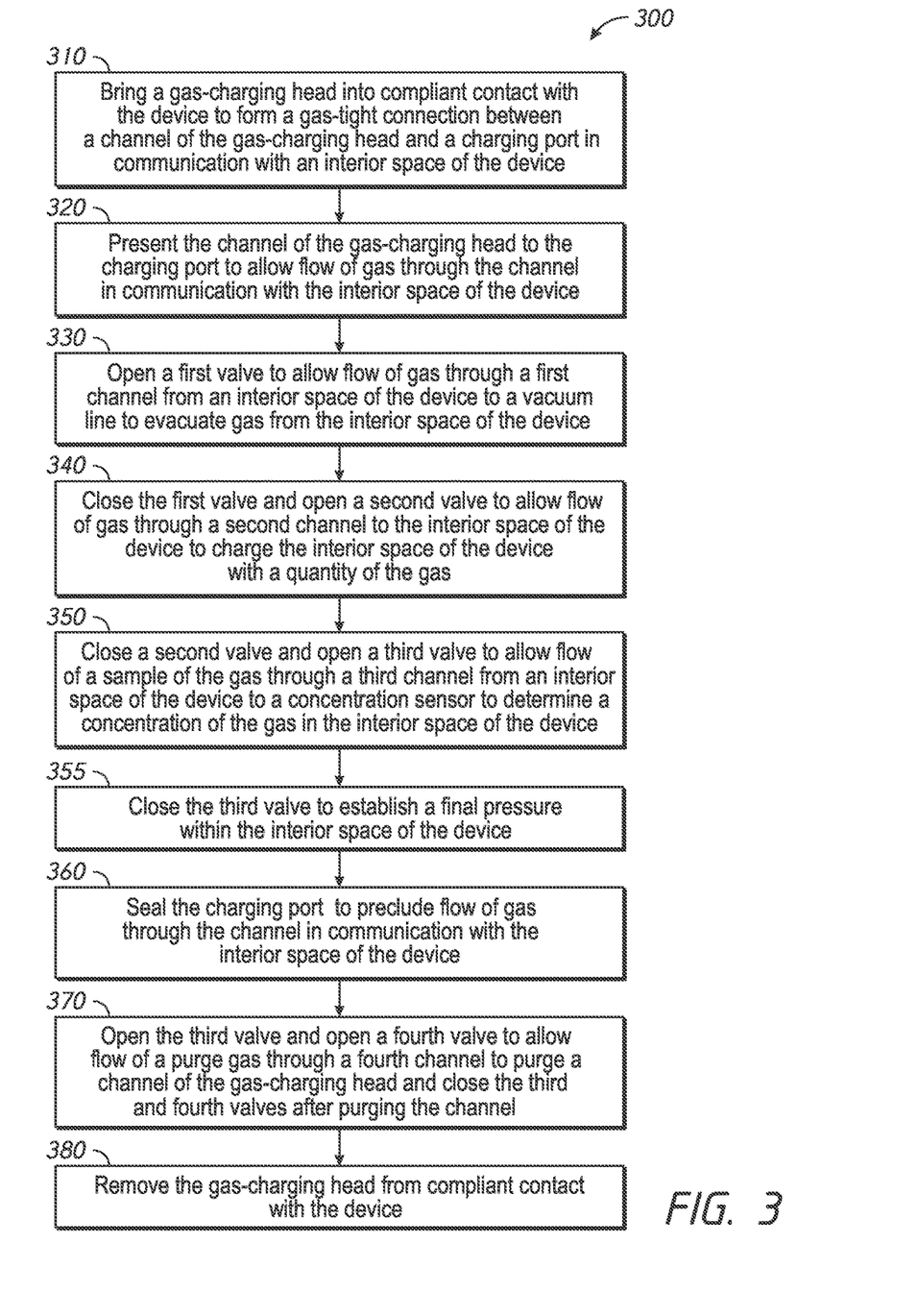
FIG. 3 is a flow chart of a method of using the gas-charging head to charge a device with a quantity of gas, in one or more embodiments described herein.

Referring now to FIG. 3, in one embodiment, a flow chart of a method 300 of using the gas-charging head 100 to charge a device with a quantity of gas is shown. Although the subsequently described operations of the flow chart are recited in a particular order as indicated by the number labels of the blocks shown therein, this is by way of example and not limitation, as the re-ordering of particular operations within the flow chart is also within the spirit and scope of one or more embodiments described herein. At 310, the gas-charging head is brought into compliant contact with the device to form a gas-tight connection between a channel of the gas-charging head and a charging port in communication with the interior space of the device. At 320, the channel of the gas-charging head is presented to the charging port to allow flow of gas through the channel in communication with the interior space of the device. (As used herein, the phrase "presented to the charging port" may refer to removing a screw from the charging port, or alternatively, engaging with an open charging port not having a screw, without limitation thereto.) At 330, a first valve is opened to allow flow of gas through a first channel from an interior space of the device to a vacuum line to evacuate gas from the interior space of the device. At 340, the first valve is closed and a second valve is opened to allow flow of gas through a second channel to the interior space of the device to charge the interior space of the device with a quantity of the gas. At 350, the second valve is closed and a third valve is opened to allow flow of a sample of the gas through a third channel from an interior space of the device to a concentration sensor to determine a concentration of the gas in the interior space of the device. At 355, the third valve is closed to establish a final pressure within the interior space of the device. At 360, the charging port is sealed to preclude flow of gas through a channel in communication with the interior space of the device. (As used herein, the phrase "sealed to preclude flow of gas" may refer to tightening a screw in the charging port to preclude gas flow therethrough, or alternatively, placing a charging-port seal, by way of example without limitation thereto, a gas-flow-restricting sticky label, over an orifice of a charging port not having a screw, without limitation thereto.) At 370, the third valve is opened and a fourth valve is opened to allow flow of a purge gas through a fourth channel to purge the channel of the gas-charging head; and, after purging the channel, both the third valve and the fourth valve are closed. At 380, the gas-charging head is removed from compliant contact with the device.

Additional Embodiments

Those skilled in the art will appreciate that in some embodiments, other types of data storage devices can be implemented while remaining within the scope of the present disclosure. In addition, the actual steps taken in the processes discussed herein may differ from those described or shown in the figures. Depending on the embodiment, certain of the steps described above may be removed, others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, although embodiments within the environment of data storage devices have been described primarily for HDDs, this has been by way of example without limitation thereto, as other devices are also within the spirit and scope of those embodiments described herein. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A gas-charging head for charging a device with gas, comprising:
a body having a plurality of channels configured to communicate with an interior space of the device, at least one channel configured to permit a flow of gas therethrough;
a pressure transducer in communication with the plurality of channels and configured to sense gas pressure; and
at least one valve mounted on the body in communication with the at least one channel of the plurality of channels;
wherein
the body and a portion of the at least one channel are operable as a valve manifold for the at least one valve, and
the gas-charging head is configured to communicably couple to a system having a controller configured to receive a signal from the pressure transducer and to control a signal supplied to the at least one valve to control flow of the gas therethrough.

2. The gas-charging head of claim 1, wherein the body has a plurality of channels configured to permit a flow of gas therethrough to the device.

3. The gas-charging head of claim 1, wherein the body has a plurality of channels configured to permit a flow of gas therethrough from the device.

4. The gas-charging head of claim 1, wherein a volume of the plurality of channels is less than a volume of a corresponding plurality of dedicated valve manifolds and tubulation for a gas-flow that the plurality of channels are configured to supply.

5. The gas-charging head of claim 1, wherein a plurality of valves are mounted on the body, a first valve of the plurality of valves being configured to communicate with a vacuum line.

6. The gas-charging head of claim 1, wherein a plurality of valves are mounted on the body, a second valve of the plurality of valves being configured to communicate with a gas-supply line.

7. The gas-charging head of claim 6, wherein the gas-supply line is configured to supply a gas having molecular weight less than that of air to charge the device.

8. The gas-charging head of claim 1, wherein a plurality of valves are mounted to the body, a third valve of the plurality of valves being in communication with a third channel of the plurality of channels, and being configured to communicate with a gas-concentration sensor.

9. The gas-charging head of claim 8, wherein the third valve is connected to the third channel in the body via a gas-sampling line.

10. The gas-charging head of claim 1, wherein a plurality of valves are mounted on the body, a fourth valve of the plurality of valves being configured to communicate with a purge-gas-supply line.

11. The gas-charging head of claim 1, wherein the device is a data storage device.

12. The gas-charging head of claim 11, wherein the data storage device is a hard-disk drive (HDD).

13. The gas-charging head of claim 1, wherein
the controller is a proportional-integral-differential (PID) controller, and
the PID controller controls a current supplied to the at least one valve to proportionally control flow of the gas therethrough based on the signal from the pressure transducer.

14. The gas-charging head of claim 13, wherein a plurality of valves are in communication with the plurality of channels, and
wherein the PID controller is configured to control gas flows through the plurality of valves.

15. The gas-charging head of claim 13, wherein the system further includes a system controller configured to direct an output of the PID controller to at least one of the valves.

16. The gas-charging head of claim 13, further including a connecting device to connect the gas-charging head with the device.

17. The gas-charging head of claim 1, further including a sealing tool configured to loosen a charging port screw in a charging port of the device.

18. The gas-charging head of claim 1,
wherein
a rod is disposed in a fifth channel of the gas-charging head,
the fifth channel is configured to communicate with a charging port of the device, and
a charging-port seal is disposed on the end of the rod, the rod being configured to place the charging-port seal over an orifice of the charging port.

19. A gas-charging head for charging a device with gas, comprising:
a body having a plurality of channels configured to communicate with an interior space of the device, at least one channel configured to permit a flow of gas therethrough; and
at least one valve mounted on the body in communication with the at least one channel of the plurality of channels;
wherein
the body and a portion of the at least one channel are operable as a valve manifold for the at least one valve, and
the gas-charging head is incorporated into a system, further comprising:
a proportional-integral-differential (PID) controller, and
a pressure transducer in communication with the plurality of channels and configured to sense gas pressure within the interior space of the device,
wherein the PID controller senses a signal from the pressure transducer and controls a current supplied to the at least one valve to proportionally control flow of the gas therethrough.

* * * * *